United States Patent [19]

Engler et al.

[11] 4,111,857
[45] Sep. 5, 1978

[54] HIGHLY CONDUCTING ORGANOMETALLIC POLYMERS

[75] Inventors: Edward Martin Engler, Wappingers Falls; Kenneth Herbert Nichols, Peekskill; Vishnubhai Vitthalbhai Patel, Ossining; Nilda Martinez Rivera, Peekskill, all of N.Y.; Robert Rhees Schumaker, Los Gatos, Calif.

[73] Assignee: International Business Machines Corporation, Armonk, N.Y.

[21] Appl. No.: 783,379

[22] Filed: Mar. 31, 1977

[51] Int. Cl.² ............ C08G 75/00; C08G 79/00
[52] U.S. Cl. ................ 528/226; 260/329 ME; 260/429.9; 260/439 CY; 260/429 R; 260/438.1; 260/438.5 R; 528/377; 528/379
[58] Field of Search ........................... 260/2 M

[56] References Cited

U.S. PATENT DOCUMENTS 3,294,761  12/1966  Warner ........................... 260/2 M

OTHER PUBLICATIONS

*J. Chemical Society Chemical Communications* (London), Jun. 1974, Bechgaard, K. et al. pp. 937–938.
*J. American Chemical Society*; Ferrasis, J. et al. vol. 95, pp. 948–949.

*Primary Examiner*—Wilbert J. Briggs, Sr.
*Attorney, Agent, or Firm*—Hansel L. McGee

[57] ABSTRACT

This application is directed to highly conducting organometallic polymers having the following recurring units

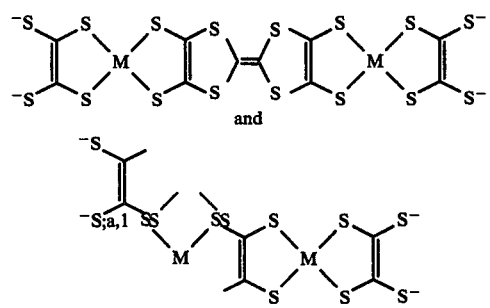

where M is at least one multivalent metal.

8 Claims, No Drawings

HIGHLY CONDUCTING ORGANOMETALLIC POLYMERS

FIELD OF THE INVENTION

The present disclosure is directed to novel organometallic polymers and their synthesis. These compositions can be used as antistatic agents and as conductive coatings in electronic devices.

PRIOR ART

The compositions of the present disclosure can properly be described as polymer derivatives of tetrathiapentalene and tetraselenapentalene compounds. These compounds have the general formulae

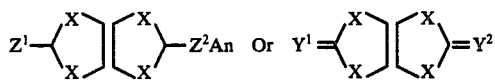

wherein X is S or Se; each of $Y^1$ and $Y^2$ is O, S, or Se; each of $Z^1$ and $Z^2$ is —SR, SeR or

wherein R and $R^1$ are H, alkyl, aryl, or together form a ring of carbon atoms; and An is the anion of a strong acid. Until recently these compounds were believed to be heretofore unknown. These compounds and their synthesis have been disclosed in copending patent application Ser. No. 755,891 to Edward M. Engler and R. R. Schumaker filed on Dec. 30, 1976 and assign to the same assignee as is the present application.

It is believed that until the present disclosure, there has been no polymerization of these materials. More particularly there has been no disclosure of metallic polymers prepared from these compounds.

SUMMARY OF THE INVENTION

The overall synthetic procedure for the preparation of compositions of the present invention is briefly outlined below. The compound 2, 5 diketo - 1,3,4,6 tetrathiapentalene (diketo TTP)

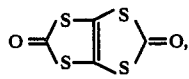

which method of preparation is described in copending application Ser. No. 755,891 filed on Dec. 30, 1976 and is incorporated herein by reference, is dimerized by treatng the same with trimethyl phosphite in benzene, (as described in aforesaid application Ser. No. 755,891) filed on Dec. 30, 1976. The dimer (dimeric diketo TTP)

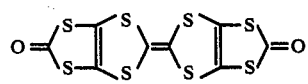

is treated with either sodium ethoxide or methyl lithium to give the corresponding tetrathiafulvalene tetrathiolate e.g.

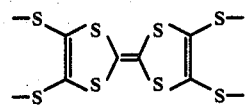

The identity of the tetrathiafulvalene (TTF) tetrathioanion salt is proven by its further reaction to the known tetramethoxy TTF derivatives which had been prepared by an independent method, e.g.

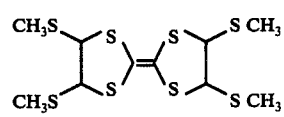

The tetrathiafulvalene tetrathio anion is then reacted with a metal salt to yield a poly (metal) tetrathiafulvalene tetrathiolate, e.g.

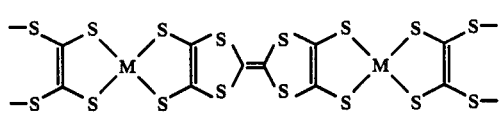

Alternately, 2, 5 diketo — 1,3,4,6 tetrathiapentalene can be treated with sodium ethoxide or methyl lithium to form the ethylene tetrathiolate salt

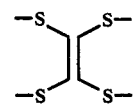

Reacting the ethylene tetrathiolate salt with a metal salt gives poly (metal) ethylene - tetrathiolate

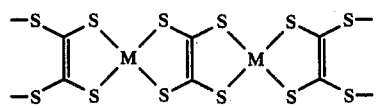

The thiolate salts of 2,5 diketo — 1,3,4,6 — tetrathiapentalene and its dimer are bifunctional tetradentate ligands, and can be reacted with a wide variety of transition metals and other reagents to provide polymeric systems in which the tetrathiolate ligand bridges the reacting metal reagent in an alternating sequence as shown above.

Di-, tri, and tetravalent metal salts react readily with either tetrathiolate salt by refluxing in ethanol or other solvents for several hours to give black powders isolated by simple filtration. When a divalent metal ion is coordinated in the polymer, two sodium counter-ions per repeating metal bis-dithiolene unit may be involved for overall charge neutrality, or other counter-ions may be involved. Variations in polymer type are possible depending on the configuration of the ligands coordinated around the metal ion. In general, square planar or tetrahedral arrangements are the most common for bis-dithiolene metal systems and similar configurations are expected in the polymeric systems, especially for metals such as $Ni^{+2}$, $Pd^{+2}$, $Pt^{+2}$, $Cu^{+2}$ and $Zn^{+2}$. Intermediate or distorted ligand configurations are also possible. In the planar arrangement of ligands around the metal ion, a planar polymer chain suitable for favorable solid state interactions is expected. Other variations of ligand configurations are possible depending on the character of the metal ion. For example, higher coordination states other than tetravalent may be obtained (for example with metals such as Re, Mn, Cr, and W, as well as bonding schemes in which a metal ion is shared between polymer chains or bonded to other added coordination ligands. Metal-metal interactions between chains are also possible. Mixed-valence oxidation states can be involved in some of these coordination polymers, a factor known to be important in leading to high conductivity.

Different multivalent metals can be copolymerized with either tetrathiolate salt to yield mixed metal polymeric materials. Also, a transition metal in different oxidation states can be polymerized simultaneously.

The disclosed organometallic polymer materials are of considerable interest since they display interesting and unusual optical, magnetic and electrical properties. In particular the nickel tetrathiafulvalene tetrathiolate polymer has been found to have a compaction conductivity of $\sim 30$ (ohm-cm)$^{-1}$ an unusually high value for an amorphous organometallic polymer. When M = Zn, Co, Fe, Pt in the polymer, the resulting polymer is less conducting. A rather wide range of conductivities are obtainable depending on the multivalent metal employed. Table I gives the room temperature compaction conductivities of some of the more highly conducting related organometallic polymers reported in the literature. The nickel tetrathiafulvalene tetrathiolate polymer is shown to be orders of magnitude more conducting. It is also interesting to note that the conductivities of neutral TTF and nickel bis-dithiolene compound, as it were the component parts of poly nickel tetrathiafulvalene tetrathiolate, are both much lower. Spectrophotometric measurements of this polymer in KBr show strong electronic absorptions at 2900Å and 3100Å, characteristic of the dithiolene moiety and an intense broad absorption into the infrared which is typical of an electronic mechanism contributing to the high conductivity in the polymer.

Table I.

| Comparative Room Temperature Compaction Conductivities | |
|---|---|
| Compound | $\sigma$RT (ohm-cm)$^{-1}$ |
| poly (nickel tetrathiafulvalene-tetrathiolate) (VI), M = Ni | $3 \times 10^1$ |
| nickel bis-dithiolene | $7.5 \times 10^{-6}$ |
| tetrathiafulvalene | $1 \times 10^{-12}$ |
| −OOC, S, M, S, COO−, −OOC, S, S, COO−, 2M$^{+2}$, M = Cu$^{+2}$, Ni$^{+2}$, Co$^{+2}$ | $7.4 \times 10^{-5}$ – $4.6 \times 10^{-8}$ |

Table I.-continued

| Comparative Room Temperature Compaction Conductivities | |
|---|---|
| Compound | $\sigma$RT (ohm-cm)$^{-1}$ |
| H$_2$NC(O), S, Cu, S, COO−, −OOC, S, S, CNH$_2$(O), Cu$^{+2}$ | $3.2 \times 10^{-1}$ |

In practice the starting materials, 2,5-diketo-1,3,4,6-tetrathiapentalene and its dimer $\Delta^{2,2'}$-bis-(5-keto, 1,3,4,6-tetrathiapentalene (diTTP) are prepared according to the following scheme

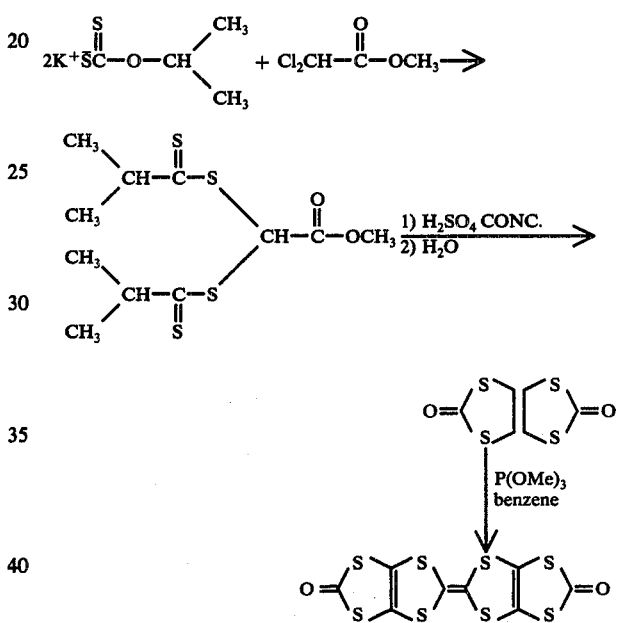

As shown, the synthesis of the starting materials includes the condensation of an alkyl dithiocarbonate salt with methyl dichloroacetate. The condensation product is then cyclized by acid and water treatments. The details of the method can be found in the above mentioned copending application Ser. No. 755,891.

The tetrathiolate salts which are used as intermediates in the present invention are prepared according to the following schemes

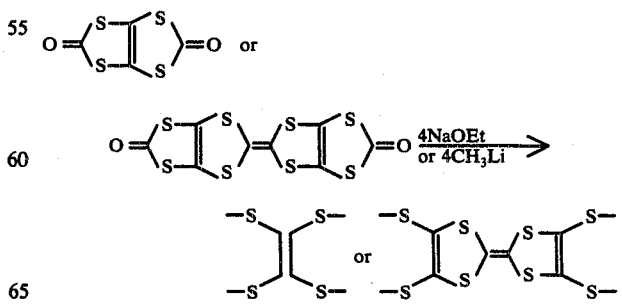

These tetrathiolate salts can then be reacted with a metal salt. The metal can be selected from one or more multivalent metals such as, Cu, Ni, Fe, Pt, Pd, Zn, Re, Mn, Cr, W, and Co.

Many extensions of the above mentioned synthetic procedures are possible. For example, dimeric diketo TTP can be treated with 2 equivalence of either sodium ethoxide or methyl lithium to give the monoketo dithioanion salt which can be treated with methyl

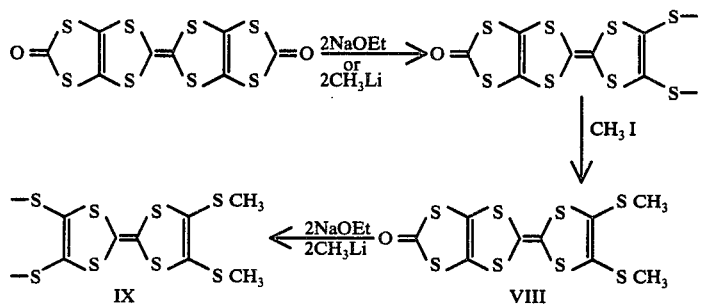

iodide to give 2-keto-5-(4', 5'-dithiomethoxy-1',3'-dithioliden-2'-yl) TTP. This material can then be treated with 2 equivalence of NaOEt or methyl lithium to give dithiomethoxyl TTF dithioanion which can be reacted with a wide variety of multivalent metals, to yield novel bis-(tetrathiafulvalene) dithiolene metal compounds as shown below by the following formula

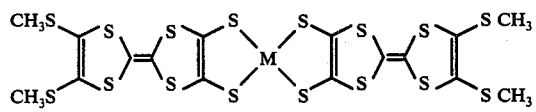

where M = a multivalent metal.

The following examples are given solely for purposes of illustration and are not to be considered limitations on the invention, many variations of which are possible without departing from the spirit or scope thereof.

EXAMPLE 1

Dimeric diketo tetrathiapentalene is reacted with 4 equivalence of a solution of sodium ethoxide in ethanol under nitrogen and refluxed for two hours. A dark solution of sodium tetrathiafulvalene (TTF) tetrathioanion resulted. To this solution is added one equivalence of nickel acetylacetonate and the solution refluxed overnite. A black poly (nickel tetrathiafulvalene tetrathiolate) precipitates from the reaction mixture and is collected by filtering. It is washed extensively with water, ethanol and acetone, and dried in a vacuum oven. Elemental analysis gave 15.1% nickel composition. Spectrophotometric measurement in KBr showed strong electronic absorptions at 2900Å and 3100Å, characteristic of the dithiolene moiety and an intense broad absorption into the infrared. The compaction conductivity was 50 (ohm-cm)$^{-1}$.

EXAMPLE 2

The same procedure is followed as described in example 1, except that 1 equivalence of CuCl$_2$ is added to give a black precipitate of poly (copper tetrathiafulvalene tetrathiolate). Elemental analysis for copper: 10.8%. Compaction conductivity: 1.1 × 10$^{-1}$ (ohm-cm)$^{-1}$. Broad electronic absorption (KBr) seen at 10,000Å.

EXAMPLE 3

The same procedure is followed as described in example 1, except that 1 equivalence of FeCl$_2$ is added to give a black precipitate of poly (iron tetrathiafulvalene tetrathiolate). Elemental analysis for iron: 17.0%. Compaction conductivity: 5.6 × 10$^{-5}$ (ohm-cm)$^{-1}$. Broad electronic absorption (KBr) seen at 11,000Å.

EXAMPLE 4

The same procedure is followed described in example 1, except that 1 equivalence of CrCl$_3$ is added to give a black precipitate of poly (chromium tetrathiafulvalene tetrathiolate). Elemental analysis for chromium: 6.4%. Broad electronic absorption (KBr) seen at 10,000Å.

EXAMPLE 5

The same procedure is followed as described in example 1, except that one equivalence of CuCl$_2$ and two equivalence of Ni acetylacetonate are added to give a black precipitate of poly (nickel-copper tetrathiafulvalene tetrathiolate). Elemental analysis for: nickel 2.4%, copper 16.6%. Compaction conductivity: 40 (ohm-cm)$^{-1}$.

EXAMPLE 6

The same procedure is followed as described in example 1, except that 2 equivalence of zinc chloride (ZnCl$_2$) is added to give a brown black precipitate of poly (zinc tetrathiafulvalene tetrathiolate). Elemental analysis for zinc: 28.1%. Broad electronic absorption (KBr) seen at 10,500Å.

EXAMPLE 7

The same procedure is followed as described in example 1, except that 2 equivalence of K$_2$PtCl$_4$ is added to give a brown black precipitate of poly (platinum tetrathiafulvalene tetrathiolate). Elemental analysis for platinum: 24.2%. Compaction conductivity: 10$^{-4}$ (ohm-cm)$^{-1}$. Broad electronic absorption seen at 11,000Å.

EXAMPLE 8

The same procedure is followed as described in example 1, except that 1 equivalence of FeCl$_2$ and one equivalence of FeCl$_3$ are added to give a black precipitate of poly (iron tetrathiafulvalene tetrathiolate). Elemental analysis for iron: 10.9%. Compaction conductivity: 1.3 × 10$^{-5}$ (ohm-cm)$^{-1}$.

EXAMPLE 9

Treatment of 2,5-diketo tetrathiapentalene, with 4 equivalence of a solution of sodium ethoxide in ethanol under nitrogen, and refluxed for two hours generates a dark solution of sodium ethylene tetrathioanion. To this solution is added 2 equivalence of nickel acetylacetonate and the solution refluxed overnite. The black poly (nickel ethylene tetrathiolate) precipitates from the reaction mixture and is collected by filtering and washed extensively with water, ethanol and acetone. Elemental analysis for nickel: 11.0%. Compaction conductivity: $10^{-3}$ (ohm-cm)$^{-1}$. Electronic absorptions (KBr) seen 3900Å and 12,500Å.

EXAMPLE 10

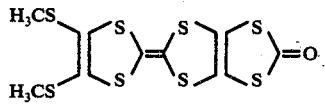

2-keto-5-(4',5'-dithiomethoxy-1',3'-dithioliden-2'-yl)-1,3,4,6-tetrathiapentalene or -2-keto-5(-4',5'-dithiomethoxy-1',3'-dithioliden-2'-yl) TTP. Treatment of 1 part dimeric diketo TTP in 250 parts of anhydrous tetrahydrofuran with 2 equivalence of methyl lithium (1.45 M in ether) at ice temperature for two hours followed by the addition of 3 parts methyl iodide gives a solution from which is obtained by chromatography on silica gel, 2-keto-5-(4',5'-dithiomethoxy-1',3'-dithioliden-2-yl) TTP; mp 178°d., mol. wt. (mass spec.), calcd., 385.818; 385.819.

EXAMPLE 11

Treatment of 2-keto-5-(4',5'-dithiomethoxy-1',3'-dithioliden-2-yl) tetrathiapentalene, prepared in example 10, with 2 equivalence of sodium ethoxide in ethanol and refluxed for 2 hours generates a dark solution of lithium dithiomethoxytetrathiafulvalene dithioanion.

To this solution is added one equivalence of nickel acetylacetonate and the solution refluxed overnite. The resultant black precipitate of bis-(dithiomethoxytetrathiafulvalene)-bis-dithiolene nickel

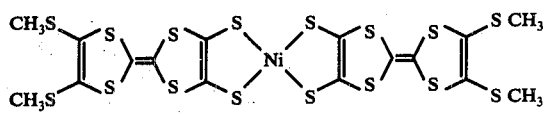

is collected by filtering and is washed extensively with water, ethanol and acetone. This material is crystallized from chlorobenzene. Elemental analysis for nickel: 7.5%. Compaction conductivity: 1 (ohm-cm)$^{-1}$.

What is claimed is:

1. A poly metal tetrathiafulvalene tetrathiolate composition having the following general recurring unit

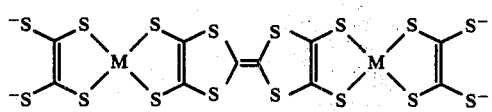

where M is at least one multivalent metal.
2. The composition of claim 1 wherein M is Ni.
3. The composition of claim 1 wherein M is Cu.
4. The composition of claim 1 wherein M is Fe.
5. The composition of claim 1 wherein M is Cr.
6. The composition of claim 1 wherein M is Ni and Cu.
7. The composition of claim 1 wherein M is Zn.
8. The composition of claim 1 wherein M is Pt.

* * * * *